United States Patent
Farhangi et al.

(10) Patent No.: US 10,990,385 B1
(45) Date of Patent: Apr. 27, 2021

(54) STREAMING CONFIGURATION MANAGEMENT

(71) Applicant: Amazon Technologies, Inc., Seattle, WA (US)

(72) Inventors: Alireza Farhangi, North Vancouver BC (CA); Alexandr Moroz, Vancouver BC (CA); Kiran Meduri, Bothell, WA (US); Alec Peterson, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 16/218,199

(22) Filed: Dec. 12, 2018

(51) Int. Cl.
*G06F 9/455* (2018.01)
*G06F 8/71* (2018.01)
*G06F 9/445* (2018.01)
*G06F 11/14* (2006.01)
*G06F 8/65* (2018.01)
*G06F 3/06* (2006.01)

(52) U.S. Cl.
CPC .............. *G06F 8/71* (2013.01); *G06F 8/65* (2013.01); *G06F 9/44505* (2013.01); *G06F 9/45558* (2013.01); *G06F 11/1464* (2013.01); *G06F 3/0644* (2013.01); *G06F 9/45533* (2013.01); *G06F 2009/45591* (2013.01); *G06F 2009/45595* (2013.01)

(58) Field of Classification Search
CPC ............. G06F 11/1464; G06F 11/1453; G06F 11/1448; G06F 11/1469; G06F 3/0644; G06F 3/0604; G06F 3/0641; G06F 8/62; G06F 9/45533; G06F 8/65; G06F 9/45558; G06F 8/71; G06F 9/44505; G06F 2009/45591; G06F 2009/45595; B01D 53/0462; H04L 41/0893; H04L 41/5051; H04L 67/34
See application file for complete search history.

(56) References Cited

U.S. PATENT DOCUMENTS

| | | | |
|---|---|---|---|
| 2003/0046676 A1* | 3/2003 | Cheng | G06F 8/62 717/173 |
| 2004/0003266 A1* | 1/2004 | Moshir | H04L 63/0236 713/191 |
| 2006/0053261 A1* | 3/2006 | Prahlad | G06F 3/0644 711/162 |
| 2006/0224846 A1* | 10/2006 | Amarendran | G06F 3/0604 711/162 |
| 2007/0179995 A1* | 8/2007 | Prahlad | G06F 11/1464 |
| 2007/0198713 A1* | 8/2007 | Tsao | H04L 41/0893 709/225 |
| 2008/0154987 A1* | 6/2008 | Kottomtharayil | G06F 11/1448 |

(Continued)

*Primary Examiner* — Tuan A Vu
(74) *Attorney, Agent, or Firm* — Knobbe, Martens, Olson & Bear, LLP

(57) ABSTRACT

A scalable configuration management system manages distribution of data representing changes to configuration parameters in a network computing environment. The system uses a scalable pool of configuration management components to generate sequential update data for the configuration state of service providers, and distribute the sequential update data to service consumers. The service consumers can subscribe to and receive updates to the configuration state of service providers. In some embodiments, the system can provide snapshots of the complete current state of a service provider.

14 Claims, 8 Drawing Sheets

(56) References Cited

U.S. PATENT DOCUMENTS

| | | | | |
|---|---|---|---|---|
| 2010/0070725 | A1* | 3/2010 | Prahlad | G06F 11/1453 711/162 |
| 2014/0188812 | A1* | 7/2014 | Vijayan | G06F 11/1469 707/679 |
| 2014/0196056 | A1* | 7/2014 | Kottomtharayil | G06F 9/45533 718/105 |
| 2015/0261776 | A1* | 9/2015 | Attarde | G06F 3/0641 707/664 |
| 2016/0371153 | A1* | 12/2016 | Dornemann | G06F 11/1464 |
| 2018/0265204 | A1* | 9/2018 | Ludvik | B01D 53/0462 |
| 2019/0065241 | A1* | 2/2019 | Wong | H04L 41/5051 |

* cited by examiner

STREAMING CONFIGURATION MANAGEMENT

BACKGROUND

Computing devices may be used to execute applications and otherwise provide services in a network environment. For example, a server computing device may execute one or more applications that interact with other devices via a network, or that interact with data received from network-accessible data stores. In some cases, a server computing device may execute one or more virtual machine instances that provide an abstraction of the server computing device. Applications may execute within a virtual machine instance separately from applications in other virtual machine instances hosted on the same server computing device.

During operation, the configuration of computing devices of a network service may be changed. In some cases, a configuration change may affect the availability of the network service, or affect the way in which consumers of the network service otherwise interact with the service. To mitigate or prevent such issues, information about the configuration changes may be provided to consumers of the network service.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
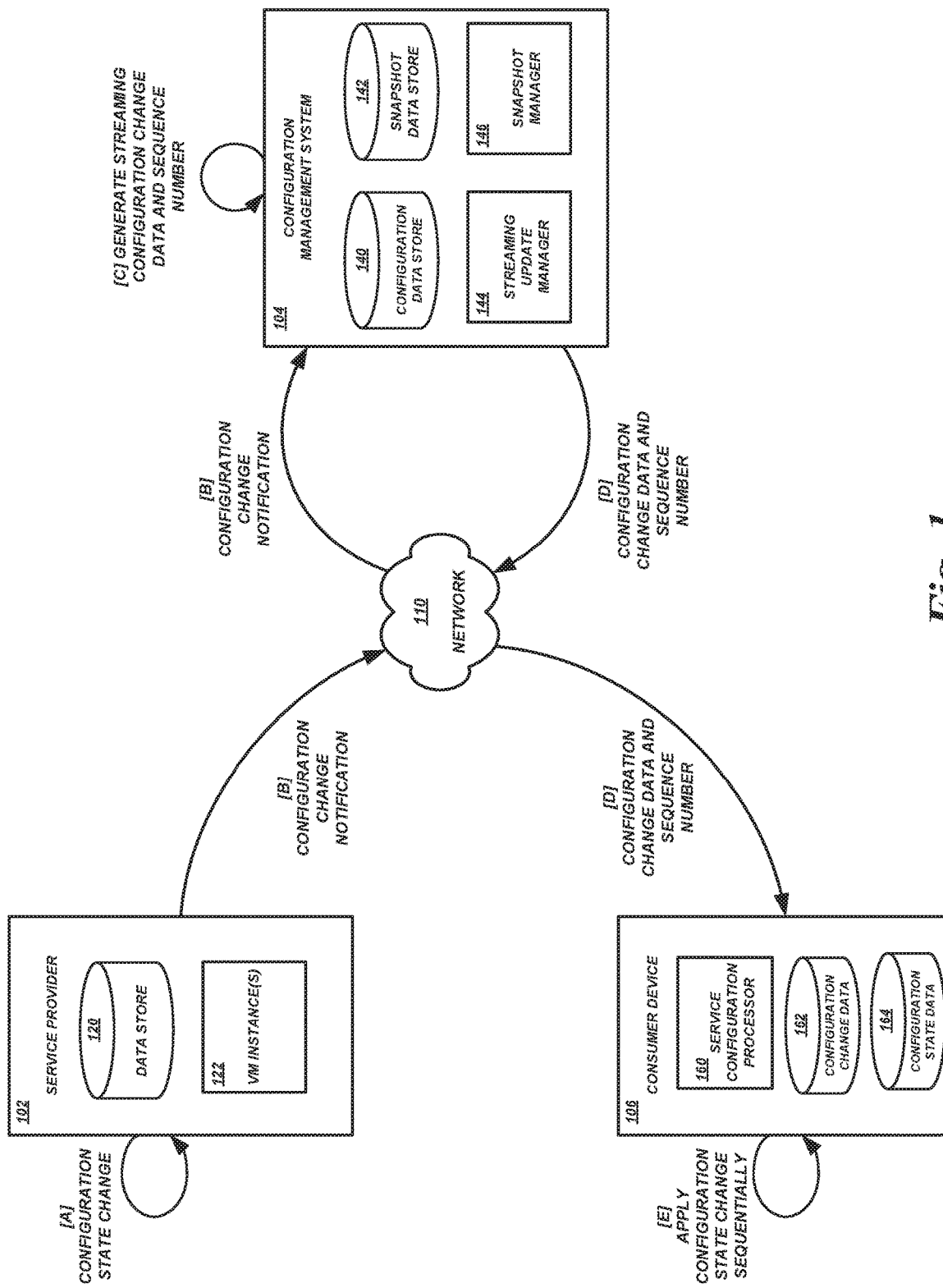
FIG. 1 is a block diagram of illustrative data flows and interactions between components of an illustrative network computing environment in connection with configuration change events according to some embodiments.

The present disclosure is directed to scalable systems and methods for managing changes to the configuration state of a service provider in a network computing environment. The scalable systems and methods provide synchronization of configuration change data to service consumers with a desired level of performance (e.g., within a desired amount of time after occurrence of a configuration change event), while maintaining efficient use of configuration management computing resources.

A service provider may provide computing services (e.g., data storage, application execution, virtual machine hosting, etc.) to consumers over a network. At a given time the service provider may have a current configuration state. The current configuration state may include various configuration parameters and corresponding configuration parameter values. Configuration parameters (also referred to herein as "parameters" for convenience) may be used to store information regarding the operation of a service provider system or individual service provider device, to control or otherwise affect the operation of the service provider system or devices, etc. For example, an application may include multiple logical branches of execution, and may determine which particular logical branch to execute based on the value of a configuration parameter. Consumers of the computing services from service provider systems may access one or more parameters in order to properly determine whether and/or how to interact with service providers. In this case, the parameters may relate to network addresses or routing, system names or components, applications names or functions, processing capabilities, current workloads, or the like.

Events may occur that cause changes to the configuration of a service provider's computing system or individual components thereof. In some cases, if service consumers are not aware of the configuration changes—or are not aware of the configuration changes in the proper sequence in which the changes have occurred—then service outages or other issues may result. A potential solution is to implement polling to provide service consumers with information about configuration changes. For example, a service consumer may poll the service provider at regular intervals (e.g., every 60 seconds, every 60 minutes, etc.) for information regarding any configuration changes that have occurred since the last time the service consumer polled the service provider. However, polling might be too infrequent to reliably provide the most up-to-date configuration information when it is needed. Alternatively, if polling is performed more frequently to capture up-to-date configuration information, the volume of polling may negatively affect the performance of the service provider, service consumer, and/or the network over which they communicate by requiring too many computing resources to handle the polling.

Some aspects of the present disclosure relate to a configuration management system that provides, to service consumers, sequential data regarding changes to the configuration of service providers. Illustratively, a service provider may provide various computing services, such as data storage, application hosting, computing power, and the like. The computing services may be provided via various computing devices, such as server computing devices. The configuration of such server computing devices may change periodically or in response to various events. For example, a server may instantiate a new application or virtual machine instance, transfer an existing instance to another device, change an attribute of a device or component, or the like. In response to these events, a configuration management system can provide information regarding the corresponding configuration change to a service consumer so that the service consumer can effectively interact with the service provider according to the current configuration of the service provider. However, applying such configuration changes in a different sequence than the sequence in which the changes occur at the service provider may lead to service irregularities or outages. To mitigate or prevent these and other issues, the configuration management system may provide configuration change data sequentially and atomically. For example, the configuration management may generate a separate configuration change data item for each configuration change that has occurred. In addition, the configuration management system may include or otherwise associate each configuration change data item with a corresponding sequence number or other sequential identifier. In this way, the service consumer can update a local version of the configuration state to reflect the occurrence of configuration changes in the proper sequence, even when multiple configuration change data items are received out-of-order or before previously-received changes can be applied to the local service configuration data maintained by the service consumer.

Additional aspects of the present disclosure relate to informing service consumers to obtain a full copy of the current configuration state of the service provider. The full copy—also referred to as a "snapshot"—can replace the existing version of the configuration state of the service provider that is maintained locally by the service consumer. In some embodiments, the configuration management system may determine that replacing local configuration data with a snapshot of the current state of the service provider is preferable over applying changes atomically and sequentially. For example, the configuration management system may determine that an error has occurred in providing prior configuration change data to a service consumer (e.g., an update was not sent, a sequence number was erroneous, etc.). As another example, the configuration management system may determine that a significant change, or substantial number of changes, has occurred to the current configuration state of the service provider. In these cases or in other cases, the configuration management system may determine that the service consumer should obtain a full copy of the configuration state rather than attempt to correct the error, apply the significant change, apply the substantial number of individual changes etc.

Further aspects of the present disclosure relate to enabling service consumers to request a snapshot of the current state of the service provider. In some embodiments, a service consumer may determine that replacing local configuration data with a snapshot of the current state of the service provider is preferable over applying changes atomically and sequentially. For example, the service consumer may only be able to process a certain number of changes per unit of time, and there may be greater number of changes to be processed than the service consumer can handle in the amount of time than it would take to obtain and apply a snapshot. As another example, the service consumer may determine that it has missed a threshold number of configuration updates, or that an error has occurred. In these cases, or in other cases, the service consumer may determine that obtaining a snapshot of the current configuration state is the most efficient or otherwise desirable course of action.

Still further aspects of the present disclosure relate to managing the scalability of the configuration management system in order to reduce processing time and otherwise provide a desired level of performance. In some embodiments, multiple instances of certain portions of the configuration management system may be implemented as separate components or "cells" in a scalable pool of such components. For example, the portions of the configuration management system that manage the distribution of configuration update data to service consumers, and the distribution of configuration snapshots to service consumers, may be implemented as multiple separate, fully-functional cells in a pool. An individual cell can manage configuration updates for a subset of service providers and/or a subset of service consumers. The pool of all cells may collectively manage configuration updates for all service providers and/or service consumers. A pool management component can add new cells or remove existing cells from the pool in order to maintain a desired level of responsiveness, latency, and resource usage. Therefore, the configuration management system can ensure that configuration change update data and snapshots are provided to service consumers within a desired period of time regardless of how many service providers and service consumers are operating at any given time.

Although aspects of some embodiments described in the disclosure will focus, for the purpose of illustration, on particular examples of service providers, configuration changes, and configuration change data transmissions, the examples are illustrative only and are not intended to be limiting. In some embodiments, the techniques described herein may be applied to additional or alternative service providers, configuration changes, configuration change data transmissions, and the like. Various aspects of the disclosure will now be described with regard to certain examples and embodiments, which are intended to illustrate but not limit the disclosure.

Computing Service Network Environment

With reference to an illustrative embodiment, FIG. 1 shows an example network environment 100 in which aspects of the present disclosure may be implemented. In some embodiments, as shown, the network environment may include various service provider systems 102, a configuration management system 104, and a service consumer device 106. The service provider systems 102, configuration management system 104, and service consumer device 106 may communicate with each other via one or more communication networks 110.

In some embodiments, the communication network 110 (also referred to simply as a "network") may be a publicly-accessible network of linked networks, possibly operated by various distinct parties, such as the Internet. In some cases, the network 110 may be or include a private network, personal area network, local area network, wide area network, global area network, cable network, satellite network, cellular data network, etc., or a combination thereof, some or all of which may or may not have access to and/or from the Internet.

The service provider systems 102 may execute applications, store data, or otherwise provide computing services to service consumers. Service provider systems 102 may also be referred to as "service providers" for convenience. A service provider 102 may be implemented using one or more physical computing devices, such as server devices, midrange computing devices, mainframe computers, desktop computers, or any other computing device configured to provide computing services. Individual service providers 102 may include various components for providing services. For example, a service provider 102 may include a data store 120 to provide data storage services. As another example, a service provider 102 may host one or more virtual machine ("VM") instances 122 to execute applications or provide other computing services to different service consumers separately from each other. In some embodiments, a computing device of a service provider 102 may execute applications under control of a single operating system without necessarily hosting a VM instance in which to execute applications.

The configuration management system 104 may manage the storage and distribution of configuration data regarding service providers 102. In some embodiments, the configuration management system 104 may manage configuration state data for groups of service providers 102 collectively as a single configuration state. In some embodiments, the configuration management system 104 may manage configuration state data for individual computing devices of a service provider 102 separately from configuration state data for other computing devices of the same service provider 102. In some embodiments, the configuration management system 104 may manage multiple, separate sets of configuration state data, some of which may be for individual service providers 102, some of which may be for groups of service providers 102, some of which may be for individual devices or components of service providers 102, some of which may be for various combinations thereof. References in the present disclosure to the configuration of a service provider 102, to configuration state data for a service provider 102, to configuration changes for a service provider 102, and the like may also apply to any of the forgoing examples.

The configuration management system 104 may include various devices and/or other components for providing configuration data management features. Illustratively, the configuration management system 104 may include a configuration change data store 140 to store data regarding individual changes to a service provider 102, and a snapshot data store 142 to store a full copy or "snapshot" of the current configuration state of a service provider 102. The configuration management system 104 may also include a streaming update manager 144 for generating and distributing sequential configuration updates to service consumers, and a snapshot manager 146 for managing the creation and distribution of configuration state snapshots. The example components and data stores of the configuration management system 104 shown in FIG. 1 are illustrative only and are not intended to be limiting. In some embodiments, a configuration management system 104 may have fewer, additional, and/or alternative components and data stores.

The configuration management system 104 may be implemented on one or more physical server computing devices. In some embodiments, the configuration management system 104 (or individual components thereof, such as the streaming update manager 144, snapshot manager 146, etc.) may be implemented on one or more host devices, such as blade servers, midrange computing devices, mainframe computers, desktop computers, or any other computing device configured to provide computing services and resources. For example, a single host device may execute one or more streaming update managers 144, snapshot managers 146, configuration change data stores 140, snapshot data stores 142, some combination thereof, etc. The configuration management system 104 may include any number of such hosts.

In some embodiments, the features and services provided by the configuration management system 104 may be implemented as web services consumable via one or more communication networks. In further embodiments, the configuration management system 104 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The service consumer device 106 may consume the services provided by one or more service providers 102, or otherwise interact with service providers 102. For example, the service consumer device 106 may access data stored by a service provider 102, utilize application execution services provided by a service provider 102, or the like. Service consumer devices 106 may also be referred to as "consumer devices" for convenience. A consumer device 106 may be implemented using one or more physical computing devices, such as server devices, midrange computing devices, mainframe computers, desktop computers, or any other computing device or appliance configured to consume services of a service provider 102 or otherwise interface with service providers 102. In some embodiments, two or more consumer devices 106 may collectively or separately consume services provided by the same provider(s) 102.

A consumer device 106 may use configuration data to determine whether or how to interact with a service provider 102. For example, the consumer device 106 may access a parameter from configuration data regarding a service provider 102 to determine which VM instances or application instances are executing at the service provider 102, the current processing load of the service provider 102, etc. In some embodiments, the consumer device 106 may include a service configuration processor 160 for processing incoming configuration change data and updating the current state of the service configuration data that is available locally to the consumer device 106. For example, the consumer device 106 may include a configuration change data store 162 for storing configuration change data received from the configuration management system 104. As another example, the consumer device 106 may include a configuration state data store 164 for storing data regarding the current configuration state of one or more service providers 102.

Sequential Configuration Change Processing

With continued reference to FIG. 1, data flows and interactions between a service provider 102, configuration management system 104, and consumer device 106 will be described. The service provider 102 may have a current configuration state affecting the provision of computing services or otherwise associated with the operation of the service provider 102. The current configuration state may include various parameters and corresponding parameter values. At [A], the configuration state of the service provider 102 may change.

Figure 2:
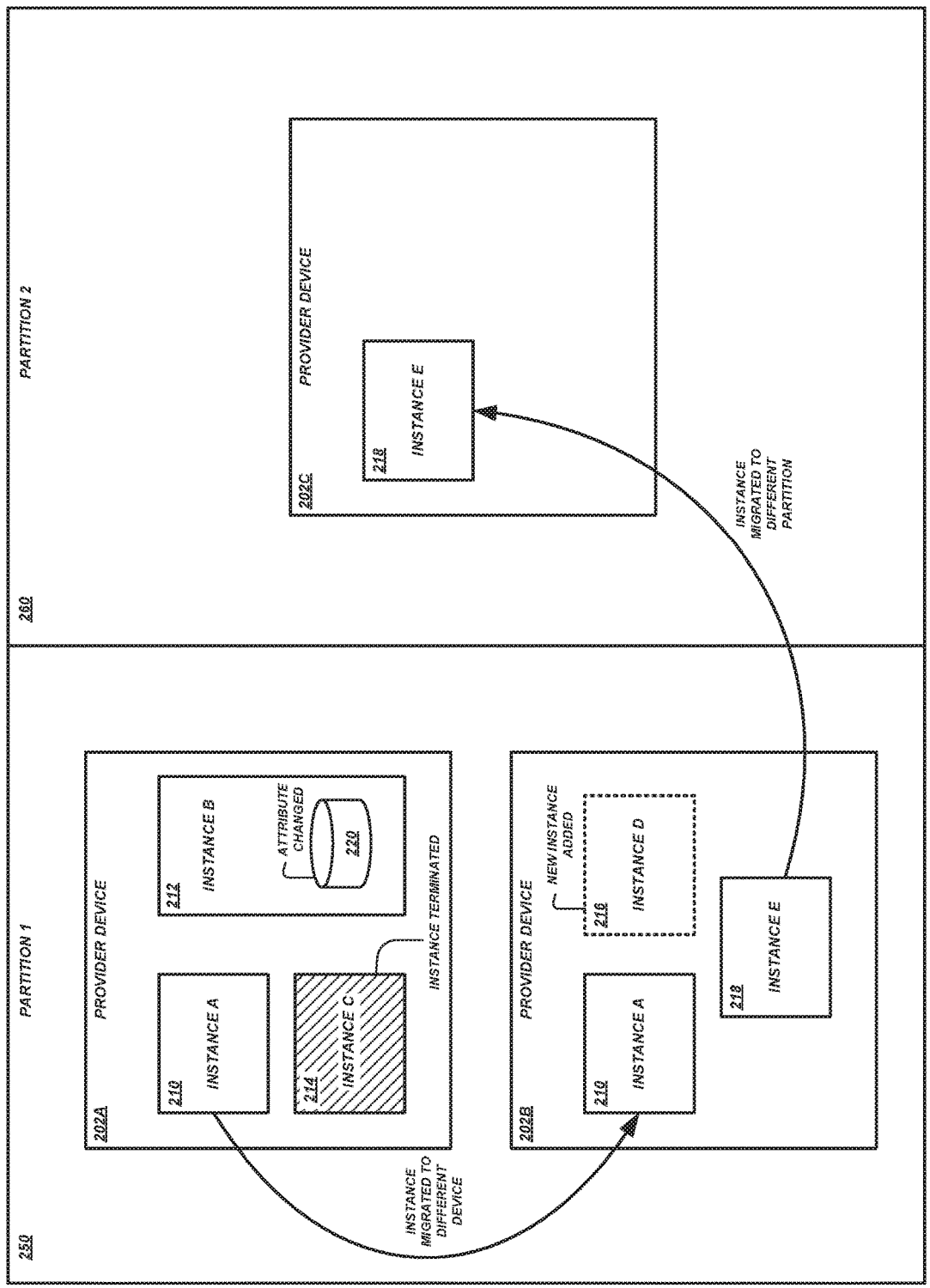
FIG. 2 is a block diagram of illustrative configuration change events in service providers according to some embodiments.

FIG. 2 shows several example events that affect the configuration state of service providers 102. For example, a service provider computing device 202A (also referred to as a "provider device" for convenience) may be hosting a VM instance 210. In response to the occurrence of some event (e.g., workload balancing, scheduling, etc.), the instance 210 may be transferred to a different provider device 202B. The movement of the instance 210 to a different provider device 202B may cause issues for other systems that expect to access the instance at provider device 202A. To ensure that other systems are kept up-to-date on this change, a configuration change notification may be generated and sent to the configuration management system 104 at [B] in FIG. 1.

As another example, the provider device 202A may be hosting VM instance 212. The VM instance 212 may be associated with attribute data 220 or "health data" describing various attributes of the VM instance 212, such as available features, current workloads, security events, warnings, etc. In response to the occurrence of an event, certain portions of the attribute data 220 may change. To ensure that other systems are kept up-to-date on this change, a configuration change notification may be generated and sent to the configuration management system 104 at [B] in FIG. 1.

As a further example, the provider device 202A may be hosting VM instance 214. In response to the occurrence of an event, the provider device 202A may terminate execution of the VM instance 214. Illustratively, VM instance 214 may be terminated based on a processing error, security violation, or the completion of processing assigned to the VM instance 214. To ensure that other systems are kept up-to-date on termination of the VM instance 214, a configuration change notification may be generated and sent to the configuration management system 104 at [B] in FIG. 1.

As yet another example, the configuration of a different provider device—provider device 202B—may change. In response to the occurrence of an event, the provider device 202B may instantiate a new VM instance 216. Illustratively, VM instance 216 may be instantiated based on a request from a consumer device 106, a predetermined or dynamically determined schedule, a determination that additional processing capabilities are to be used, or the like. To ensure that other systems are kept up-to-date on instantiation of the new VM instance 216, a configuration change notification may be generated and sent to the configuration management system 104 at [B] in FIG. 1.

In some embodiments, provider devices (or service providers) may be grouped into distinct partitions. The individual partitions may be treated as separately from each other (e.g., configuration state data may be handled separately, as described in greater detail below). For example, partition 250 may include provider devices 202A and 202B, and a different partition 260 may include provider device 202C. Provider device 202B may be executing a VM instance 218. In response to the occurrence of some event (e.g., workload balancing, scheduling, etc.), the instance 218 may be transferred to provider device 202C, which is in a separate partition 260. The movement of the instance 218 to a different provider device 202C may cause issues for other systems that expect to access the instance at provider device 202B, or in partition 250. In addition, the movement of instance 218 to a different partition 260 may cause configuration state data to be handled differently and separately from configuration state data for partition 250. To ensure that other systems are kept up-to-date on this change, a configuration change notification may be generated and sent to the configuration management system 104 at [B] in FIG. 1.

The notification that the service provider 102 sends to the configuration management system 100 at [B] may include data representing the change at [A], data identifying the time at which the change occurred (or will occur), data identifying the service provider 102, other data, some combination thereof, etc. The notification may be transmitted in the form of an electronic message with a payload, as an application programming interface ("API") call in which the notification data is provided as a parameter, or using any other technique for electronic communication of data. In some embodiments, there may be no notification transmitted at [B]. For example, the configuration management system 104 may instruct the service provider 102 to make the configuration change at [A] and therefore no notification back to the configuration management system 104 may be needed.

At [C] in FIG. 1, the configuration management system 104 can generate configuration change data for distribution to one or more consumer devices 106. The configuration change data can represent the configuration change occurring at [A], and may be based on the notification (if any) received at [B]. Advantageously, the configuration management system 104 may generate a sequence number to be associated with the data representing the configuration change. For example, the streaming update manager 144 may maintain data regarding the configuration changes that have been made (e.g., in the configuration change data store 140), including the last sequence number used for changes associated with the current service provider 102 or group of devices. When a configuration change occurs, the streaming update manager 144 may determine the most recent sequence number (e.g., the highest number) associated with the service provider 102 whose configuration has changed. The streaming update manager 144 may then store, in the configuration change data store 140, data in representing the current configuration change in connection with the next sequence number (e.g., the most recent sequence number incremented by one). The data representing the configuration change may be stored in the form of a database record, with a field for the sequence number, a field for identifying information (e.g., data identifying the service provider 102), a field for data describing the configuration change (e.g., how a configuration parameter was changed, a new parameter value for a changed configuration parameter, an additional of a new configuration parameter, a deletion of an existing configuration parameter, etc.), and the like. In some embodiments, a sequence number may not necessarily be or represent an ordinal number, but may instead take some other form from which sequence can be determined. For example, the sequence number may be a timestamp.

At [D], the configuration management system 104 can transmit sequential configuration change data to a consumer device 106. The consumer device 106 may be registered with the configuration management system 104 to subscribe to configuration updates for the service provider 102. The registration may be automatic (e.g., the consumer device 106 may automatically subscribe to configuration changes upon using the services of the service provider 102), or the consumer device 106 may perform a separate registration process. The notification may be transmitted in the form of an electronic message with a payload, as an API call in which the notification data is provided as a parameter, or using some other technique for electronic communication of data. The sequential configuration change data may include a field for the sequence number, a field for identifying information (e.g., data identifying the service provider 102), a field for data describing the configuration change (e.g., how a configuration parameter was changed, a new parameter value for a changed configuration parameter, an addition of a new configuration parameter, a deletion of an existing configuration parameter, etc.), and the like. In some embodiments, the sequential configuration change data may be the same as, or derived from, data that the configuration management system 104 stored in the configuration change data store 140.

At [E], the consumer device 106 may receive and process the sequential configuration change data. The sequential configuration change data may be received into a configuration change data store 162. In some embodiments, the configuration change data store 162 may be implemented in the form of a queue. As sequential configuration change data is received, it may be stored in the queue and processed according to the sequential order (e.g., the lowest sequence number is processed first, then the next lowest, etc.). The service configuration processor 160 may process individual sequential configuration change data records by updating the local version of the current configuration state of the service provider 102 in the configuration state data store 164. For example, the service configuration processor 160 may change a configuration parameter value in the configuration state data store 164 based on the specific sequential configuration data. As another example, the service configuration processor 160 may add or remove configuration parameters as indicated by the sequential configuration data. In addition, the service configuration processor 160 can store current state sequence data indicating the most-recently-processed sequence number. In this way, the service configuration processor 160 can keep track of how up-date-date the current configuration state is in the configuration state data store 164.

Configuration State Refresh

Figure 3:
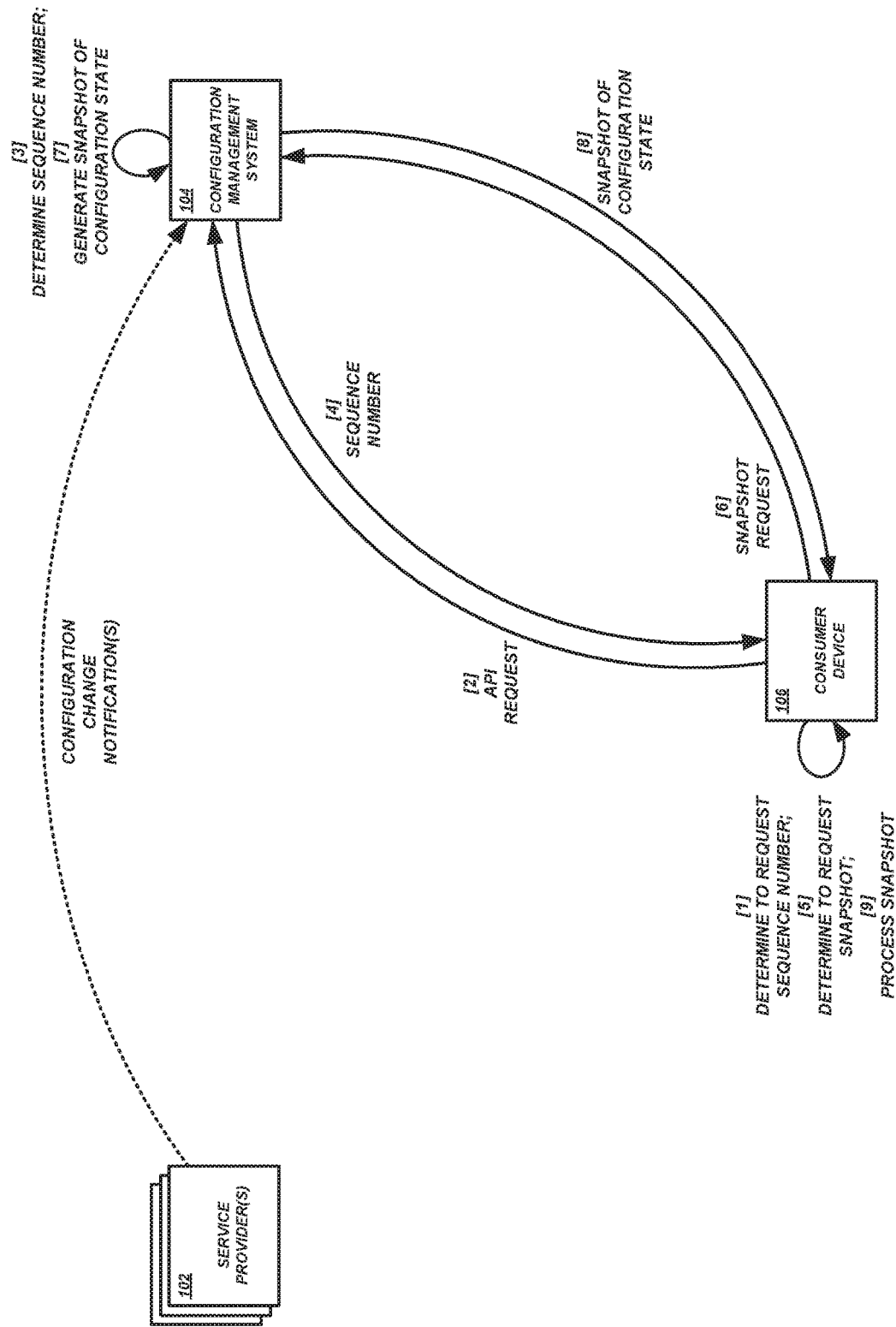
FIG. 3 is a block diagram of additional illustrative data flows and interactions between components of a network computing environment in connection with configuration change events according to some embodiments.

FIG. 3 shows data flows and interactions between a service provider 102, configuration management system 104, and consumer device 106 to refresh a current configuration state stored on a consumer device 106. In some embodiments, the data flows and interactions shown in FIG. 3 may occur after those shown in FIG. 1. For example, the consumer device 106 may have configuration data—representing a current configuration state of the service provider 102—stored in the configuration state data store 164. The consumer device 106 may also have one or more sequential configuration updates in the configuration change data store 162 to be processed.

At [1], the service configuration processor 160 may determine to request the most recent sequence number for the configuration state of a service provider 102. The determination may be based on one or more configuration data updates that have been received by the consumer device 106. For example, the consumer device 106 may receive sequential configuration change data with a sequence number that is not expected (e.g., the sequence number is not the next sequence number, when compared to the last sequence number processed by the service configuration processor 160). The service configuration processor 160 may also determine to request the most recent sequence number from the configuration management system 104 in order to determine whether to replace the entire configuration state rather than process configuration changes sequentially.

At [2], the consumer device 106 can request the most request sequence number from the configuration management system 106. The request may be made using an API request, sent in the form of a message, or sent using another form of electronic communication. For example, the configuration management system 104 may expose an API that allows remote devices, such as the consumer device 106, to request information or perform operations. One function of the API may be to respond to requests for the most recent sequence number that has been assigned to a configuration change for a particular service provider 102.

At [3], the configuration management system 104 can determine the current sequence number of the configuration state for the service provider 102. For example, the configuration management system 104 may determine a provider device identifier or partition identifier from the request received from the consumer device 106. The configuration management system 104 may then access an area of storage in which the last-used sequence number (or, in some embodiments, the next-to-be-used sequence number) is stored. Illustratively, the last-used sequence number may be stored in the configuration change data store 140, snapshot data store 142, an area of memory accessible to the streaming update manager 144, or another component that responds to the request.

At [4], The configuration management system 104 can then send a response to the consumer device 106 indicating the determined sequence number.

At [5], the consumer device 106 can determine whether to request a snapshot of the current configuration state of the service provider 102. For example, the consumer device 106 may analyze the sequence number in the response from the configuration management system 104 against the sequence number for the configuration change data that was most recently received or processed by the consumer device 106. If there is a gap between the two numbers and the configuration change data corresponding to the missing sequence numbers is not in the configuration change data store 162, then the consumer device 106 may determine to request a snapshot of the current configuration state.

In some embodiments, the consumer device 106 may determine that a quantity of configuration change data items in the configuration change data store 162 exceeds a threshold, or otherwise that the consumer device 106 is unable to process the quantity of configuration change data items efficiently. For example, the service configuration processor 160 may be able to process a certain number of configuration change data items per unit of time. The service configuration processor 160 may also be able to process a snapshot in a period of time. If the service configuration processor 160 determines that it can process a snapshot of the current state of a service provider 102 in less time, or with less computational resources, than it would take to process all pending configuration change data items, then the service configuration processor 160 may determine to forgo processing the configuration change data items and instead request a snapshot of the current configuration state.

At [6], the consumer device 106 can request a snapshot of the current configuration state for a service provider 102. The request may be made using an API request, sent in the form of a message, or sent using another form of electronic communication.

At [7], the configuration management system 104 can obtain a snapshot of the requested configuration state. In some embodiments, the snapshot may be stored in the snapshot data store 142, and the snapshot manager 146 can retrieve the snapshot. In some embodiments, the current configuration state may be stored in a different form, such as a collection of records, a format other than a snapshot, etc. In this case, the snapshot manager 146 may generate the snapshot from the corresponding configuration state data.

At [8], the configuration management system 104 can send the requested snapshot to the consumer device 106.

At [9], the consumer device 106 can process and store the snapshot. In some embodiments, the service configuration processor 160 replaces the current version of configuration state stored in the configuration state data store 164 with the snapshot received from the configuration management system 104. For example, the configuration state data store 164 may include current configuration state data for one or more service providers 102. The service configuration processor 160 can identify the service provider 102 (or group of service providers 102) for which the snapshot represents the current configuration state. The service configuration processor 160 can then replace the corresponding configuration state data. The snapshot may be stored substantially as it is received from the configuration management system 104, or the service configuration processor 160 may process the snapshot to derive the current configuration state data that is to be stored in the configuration state data store 164.

Configuration State Invalidation

Figure 4:
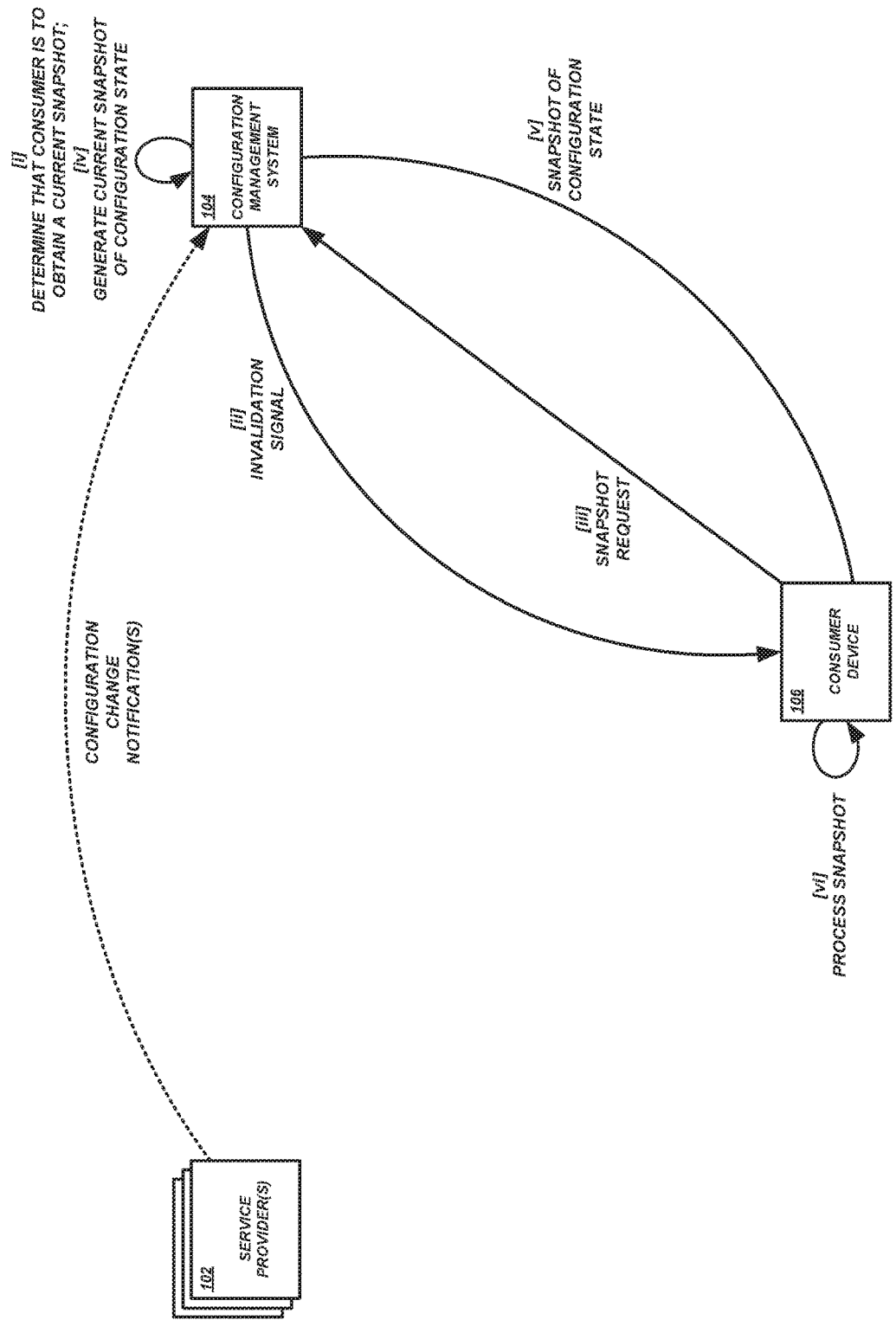
FIG. 4 is a block diagram of additional illustrative data flows and interactions between components of a network computing environment in connection with configuration change events according to some embodiments.

FIG. 4 shows data flows and interactions between a service provider 102, configuration management system 104, and consumer device 106 to refresh a current configuration state stored on a consumer device 106. In some embodiments, the data flows and interactions shown in FIG. 4 may occur after those shown in FIG. 1 and/or FIG. 3. For example, the consumer device 106 may have configuration data—representing a current configuration state of the service provider 102—stored in the configuration state data store 164. The consumer device 106 may also have one or more sequential configuration updates in the configuration change data store 162 to be processed.

At [i], the configuration management system 104 may determine that the consumer device 106 is to replace the current version configuration state data for a service provider 102 (or group of providers) with a snapshot of the current configuration state. For example, the snapshot manager 146 may determine that one or more configuration data updates sent to the consumer device 106 are erroneous. As another example, the snapshot manager 146 may determine that further changes to the configuration state will be made using a sequence number that may be different than the consumer device 106 will expect (e.g., the sequence number will be less than the current sequence number, or one or more sequence numbers following the current sequence number will be skipped). As a further example, the snapshot manager may determine that a significant change (e.g., a service resource is moved to a different partition) or significant number of changes (e.g., a number exceeding a threshold) is to be made or has been made to the configuration state. In response to one or more of these determinations and/or in response to other events, the configuration management system 104 may determine that the consumer device 106 is to replace its current local version of the configuration state for a service provider 102 with a snapshot of the current configuration state.

At [ii], the configuration management system 104 can send a notification to the consumer device 106 to replace a current local copy of the configuration state for a service provider 102 with a snapshot of the current configuration state. The notification may be an invalidation signal that indicates to the consumer device 106 that the current local copy of the configuration state is invalid. In some embodiments, the notification may be a request or command for the consumer device 106 to obtain a snapshot. In some embodiments, the configuration management system 104 may not send such a notification, but may instead send the snapshot without waiting for a request from the consumer device 106.

At [iii], the consumer device 106 can request a snapshot of the current configuration state for a service provider 102. At [iv], the configuration management system 104 can obtain a snapshot of the requested configuration state. At [v], the configuration management system 104 can send the requested snapshot to the consumer device 106. At [vi], the consumer device 106 can process and store the snapshot.

Scalable Configuration Management System

Figure 5:
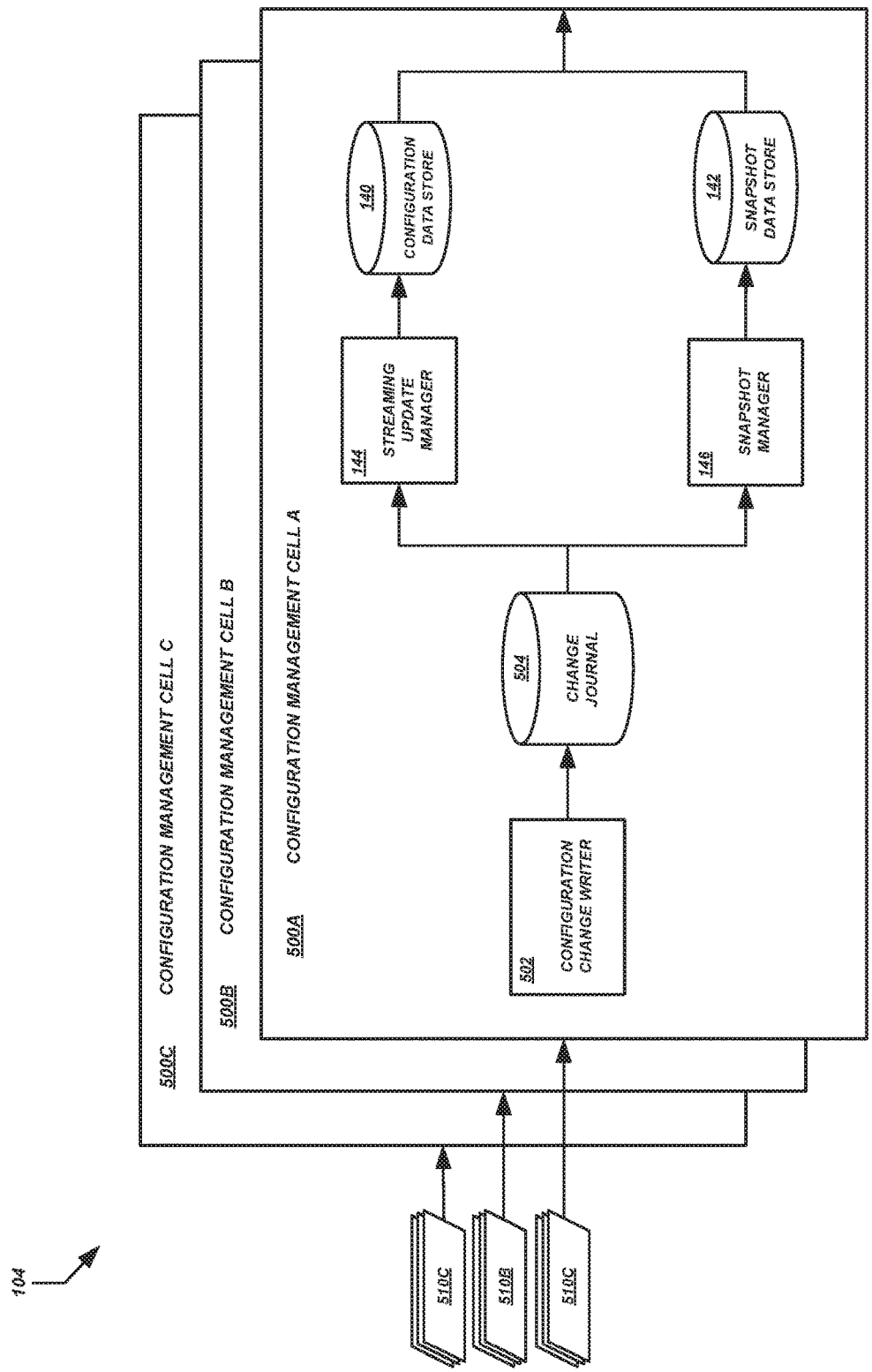
FIG. 5 is a block diagram of illustrative data flows and interactions between components of a configuration management cell according to some embodiments.

FIG. 5 shows data flows and interactions between components of an illustrative configuration management system 104 during the management of configuration changes. In some embodiments, as shown, the configuration management system 104 may include multiple configuration management components 500, also referred to as configuration management "cells." Each individual configuration management cell 500a, 500b, 500c may include a configuration change writer 502 to process data regarding configuration changes and write the changes to a change journal 504. For example, the configuration change writer 502 may receive a notification 510a, 510b, or 510c of a configuration change occurring at a service provider 102, such as a change discussed above with respect to FIG. 1 at [A], and FIG. 2. The configuration change writer 502 may generate a data record representing the configuration change and store the data record in the change journal 504. Illustratively, the change journal 504 may serve as a log or repository of data regarding individual configuration changes at service providers 102.

Each configuration management cell 500 may also include a streaming update management 144 and/or a snapshot manager 146. The streaming update manager 144 and/or snapshot manager 146 may access the change journal 504 for data regarding recent configuration changes. The streaming update manager 144 and/or snapshot manager 146 may be notified of changes saved to the change journal 504, may poll the change journal 504 for changes, or the like. For example, when an individual change occurs, the streaming update manager 144 may process the change and generate a new configuration change data item for storage in the configuration change data store 140, or the streaming update manager 144 may store configuration change data in the configuration change data store 140 substantially as it exists in the change journal 504. As another example, when an individual change occurs, the snapshot manager 146 may process the change and generate a new snapshot or update an existing snapshot in the snapshot data store 142.

The streaming update manager 144 can provide configuration change data to consumer devices 106, as described in greater detail above. In some embodiments, the streaming update manager 144 filters configuration change data and sends, to a particular consumer device 106, only the configuration change data that apples to the computing services currently being consumed by the consumer device 106, or only the configuration change data for which the consumer device 106 has subscribed to receive updates. In some embodiments, instead of—or in addition to—sending configuration change data to a consumer device 106, the streaming update manager 144 can store configuration change data in a consumer-defined endpoint or data store that is accessible to the consumer device 106. In some embodiments, the streaming update manager 144 can provide the configuration change data to a web service associated with the consumer device 106.

The streaming update manager 144 (or some other module or component of the configuration management cell 500) can determine a sequence number for individual configuration change data items and include the sequence number in the data items when they are stored and/or provided to a consumer device 106. In some embodiments, the streaming update manager 144 may also handle configuration change data items that are not associated with a sequence number, such as data regarding configuration changes for which sequence is not necessarily important (e.g., "health information" regarding a service provider, certain attribute data, etc.). The streaming update manager 144 can provide the non-sequential configuration change data using the same interface or channel as sequential configuration change data, and the consumer device 106 may process it accordingly. In this case, it may not be important to the consumer device 106 that the non-sequential configuration changes are applied or processed sequentially, because any inconsistencies or errors may be easily corrected or replaced when subsequent non-sequential configuration change data is received for the same configuration parameter (e.g., service health information that is received periodically or otherwise according to a regular schedule).

When a configuration management cell 500 is initiating the invalidation of a configuration state, a new entry may be written in the change journal 504 indicating that the current state is invalid. The indication may be accessed by the streaming update manger 144 and/or the snapshot manager 146 and an invalidation signal may be generated as described in greater detail above. In some embodiments, the invalidation may be determined by, or communicated directly to, the streaming update manger 144 and/or the snapshot manager 146 without necessarily first being stored in the change journal 504.

The snapshot manager 146 can provide configuration snapshot data to consumer devices 106, as described in greater detail above. In some embodiments, instead of—or in addition to—sending configuration snapshots and/or invalidation signals to a consumer device 106, the snapshot manager 146 can store configuration snapshots in a consumer-defined endpoint or data store that is accessible to the consumer device 106. In some embodiments, the snapshot manager 146 can provide a configuration snapshot to a web service associated with the consumer device 106.

Figure 6:
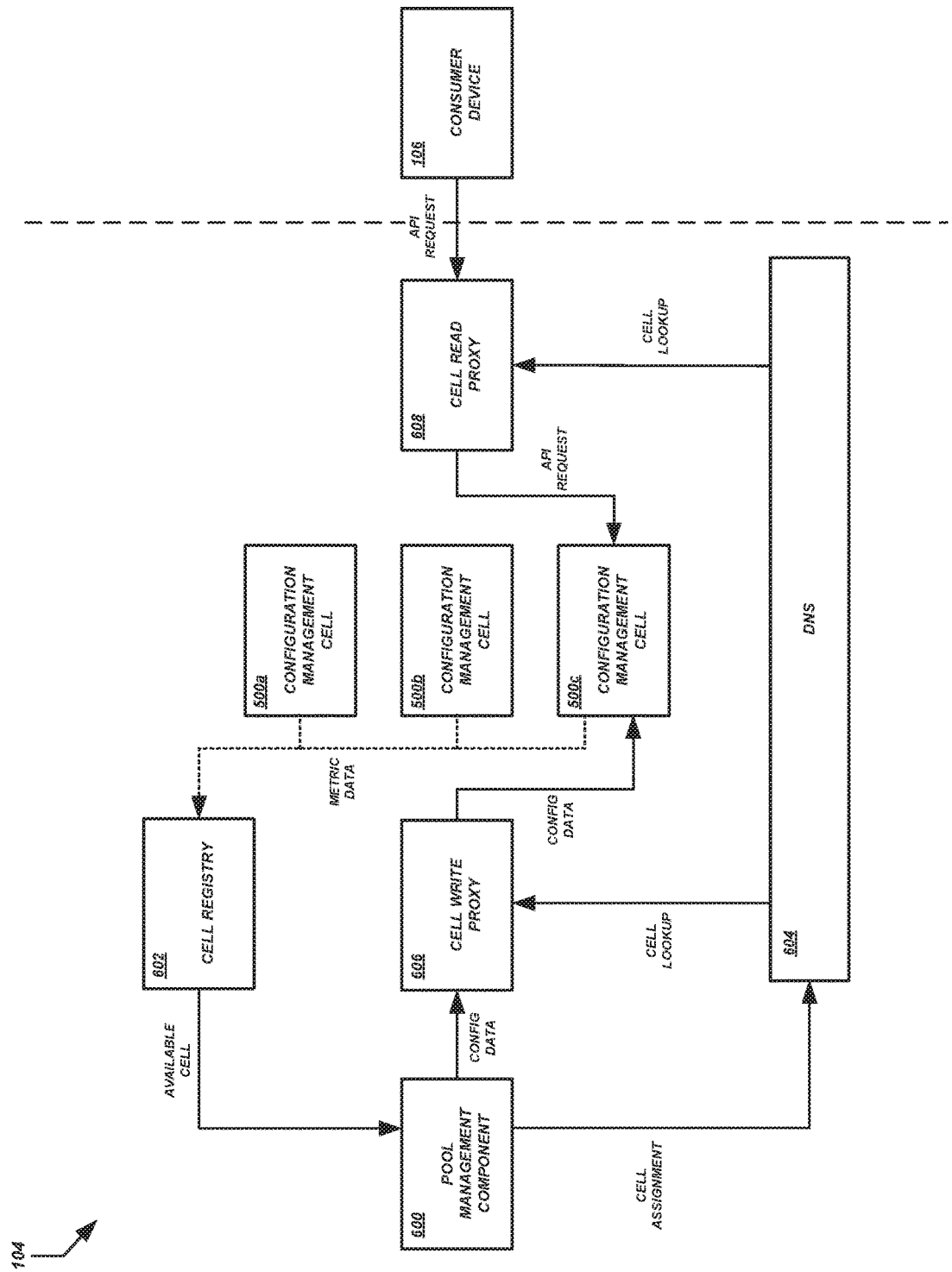
FIG. 6 is a block diagram of illustrative data flows and interactions between components and cells of a configuration management system according to some embodiments.

FIG. 6 shows components of a scalable configuration management system 104. The illustrative configuration management system 104 shown in FIG. 6 includes a pool of configuration management cells 500a, 500b, 500c. The configuration management system 104 also includes pool management component 600, a cell registry 602, a domain name system ("DNS") 604, a cell write proxy 606, and a cell read proxy 608. The pool management component 600, cell registry 602, DNS 604, cell write proxy 606, and/or cell read proxy 608 for any particular cell may each be implemented—collectively, separately, or in subsets—using one or more computing devices, such as the configuration management system 104 computing device shown in FIG. 8 and described below. In addition, although the pool of configuration management cells is shown with three configuration management cells 500a, 500b, and 500c, there may be additional or fewer cells depending upon the current state of the configuration management system 104, as discussed below.

When a service provider comes online or otherwise begins using the configuration management system 104 to synchronize configuration updates to service consumers, the service provider may be assigned to a particular configuration management cell or subset of cells. For example, the service provider may communicate with the pool management component 600, also referred to as the cell manager. The pool management component 600 may identify a particular cell or subset of cells that are to handle synchronization of configuration change data from the service provider to service consumers. Illustratively, the pool management component 600 may access the cell registry 602 to determine which cell 500a, 500b, or 500c currently has the most excess capacity or the lowest current workload. To aid in this determination, the cell registry 602 may have operating metric information regarding the cells in the pool of currently available cells, such as the total number of service providers assigned to each cell, the total number of configuration change updates handled by each cell, the total computing resources consumed by each cell, etc. The pool management component 600 may select the cell or cells that have the greatest capacity to handle configuration updates from the service provider.

After the pool management component 600 has identified a particular configuration management cell, such as cell 500c, the pool management component 600 can assign the service provider to the cell 500c. For example, the pool management component 600 can create one or more records in the DNS 604 that assign the service provider to the cell 500c. Illustratively, a record created in the DNS 604 may include an identifier of the service provider (e.g., a namespace) and an address or other identifier of the particular cell 500c (e.g., an IP address of the computing system that is hosting the cell).

When a configuration change notification is provided by the service provider, the notification may be initially received by the pool management component 600 and provided to the cell write proxy 606. In some embodiments, the notification may be sent directly to the cell write proxy 606 without going through the pool management component 600. The cell write proxy 606 may request, from the DNS 604, the appropriate cell assignment for the service provider from which the notification was received. The cell write proxy 606 may then provide the notification to the assigned cell 500c. Once the cell 500c has processed the change notification, the output of the cell 500c can be provided to the appropriate service consumer(s).

When a consumer device 106 requests information from the configuration management system 104 (e.g., an API request for the current sequence number for the configuration state for a particular service provider), the request may be sent to a cell read proxy 608. The cell read proxy 608 can request, from the DNS 604, the appropriate cell assignment for the service provider associated with the API request. The cell read proxy 608 may then provide the API request to the assigned cell 500c.

Although the configuration management system 104 is shown with three configuration management cells 500a, 500b, and 500c, there may be additional or fewer cells depending upon the current state of the configuration management system 104. The pool management component 600 may monitor operating metrics associated with the pool of cells and/or individual cells. In some embodiments, the operating metrics may include the total number of service providers assigned to individual cells and/or the entire pool, the total number of service consumers receiving updates from individual cells and/or the entire pool, the total number of configuration change updates per unit of time handled by individual cells and/or the pool of cells, the total computing resources consumed by individual cells and/or the pool of cells, other operating metrics, some combination thereof, etc. The pool management component 600 may determine whether one or more metrics satisfies a scaling criterion, such as a maximum or minimum value. Upon determining that a metric or combination of metrics satisfies a scaling criterion, the pool management component 600 can perform a pool scaling operation. Illustratively, the pool scaling operation may include adding or activating a new configuration management cell 500 if the pool management component 600 determines that the existing pool of cells are not providing a desired level of performance. The scaling operation may include deactivating or removing a configuration management cell 500 if the pool management component 600 determines that the existing pool of cells is consuming too many computing resources, and that a smaller pool will still be able to provide the desired level of performance.

Configuration State Update Process

Figure 7:
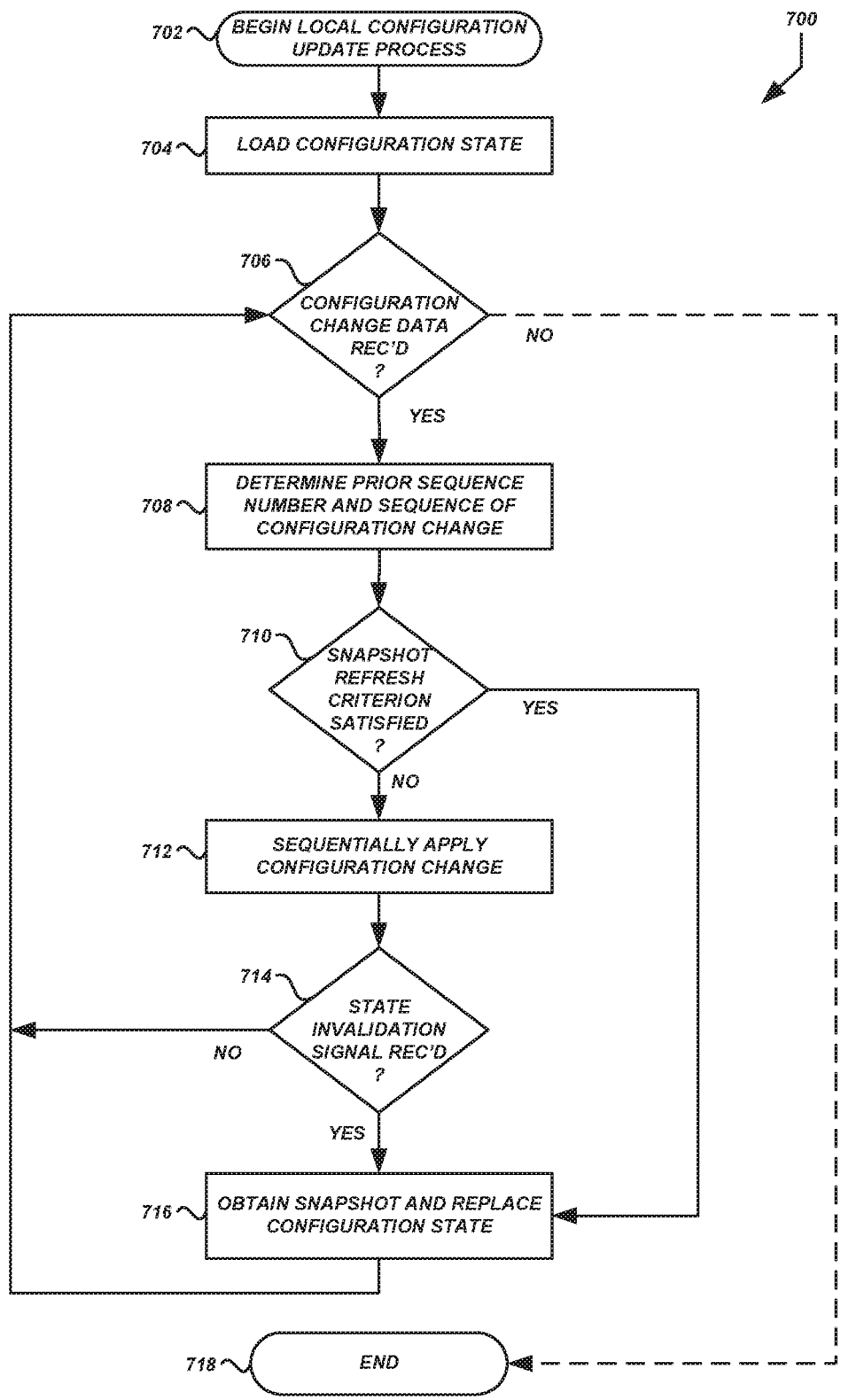
FIG. 7 is a flow diagram of an illustrative process for processing configuration change data according to some embodiments.

FIG. 7 is a flow diagram of an illustrative process 700 that may be executed by a consumer device 106 to manage local versions of configuration states of service providers 102.

The process 700 begins at block 702. The process 700 may begin in response to an event, such as when the consumer device 106 boots up, begins to consume the services of a service provider 102, or connects to the configuration management system 104. When the process 700 is initiated, a set of executable program instructions stored on one or more non-transitory computer-readable media (e.g., hard drive, flash memory, removable media, etc.) may be loaded into memory (e.g., random access memory or "RAM") of computing device. For example, service configuration processor instructions 850 shown in FIG. 8 may be loaded into memory 846 of the consumer device 106 and executed by one or more processors 840. In some embodiments, the process 700 or portions thereof may be implemented on multiple processors, serially or in parallel.

At block 704, the service configuration processor 160 or some other module or component of the consumer device 106 can load the configuration state for service provider(s) 102 from which the consumer device 106 is consuming services. The configuration state may be stored locally (e.g., in the configuration state data store 164 from a prior execution of the process 700). In some embodiments, the service configuration processor 160 can connect to the configuration management system 106 to obtain a current copy of the relevant configuration state. The service configuration processor 160 can request or automatically be provided with data regarding the current values of configuration parameters (e.g., values for all configuration parameters, values for new configuration parameters, values for configuration parameters that have changed, and/or parameter values that are otherwise different than the values stored at the configuration state data store 164).

At decision block 706, the service configuration processor 160 or some other module or component of the consumer device 106 can determine whether configuration change data has been received from the configuration management system 104. If configuration change data has been received, the process 700 can proceed to block 608. Otherwise, if no configuration change data has been received, the service configuration processor 160 can continue to monitor for configuration change data or, if service consumption has ended, the process 700 may terminate at block 718.

At block 708, the service configuration processor 160 or some other module or component of the consumer device 106 can determine the sequence number of the configuration change data that has been received. The service configuration processor 160 can also determine the sequence number of the configuration change data received immediately prior to the current configuration change data, the sequence number associated with the current state in the configuration state data store 164, or the like.

At decision block 710, the service configuration processor 160 or some other module or component of the consumer device 106 can determine whether a configuration state snapshot refresh criterion has been satisfied. For example, the service configuration processor 160 can determine whether the sequence number of the current configuration change data is unexpected (e.g., the sequence number is less than the prior sequence number, the sequence number is more than a threshold amount greater than the prior sequence number, etc.). If the sequence number is unexpected, the refresh criterion may be satisfied. As another example, the service configuration processor can determine whether there are a threshold number of configuration change data items to be processed, such that it is more efficient or otherwise desirable to refresh the configuration state using a snapshot. If it is desirable to refresh the configuration state using a snapshot, the refresh criterion may be satisfied. If the refresh criterion is satisfied, the process 700 may proceed to block 712; otherwise, the process 700 may proceed to block 716.

At block 712, the service configuration processor 160 or some other module or component of the consumer device 106 can apply configuration changes to the local version of configuration state in a sequential manner.

At decision block 714, the service configuration processor 160 or some other module or component of the consumer device 106 can determine whether an invalidation signal or other notification regarding refreshing the configuration state using a snapshot has been received. If such a signal has been received, the process 700 can proceed to block 716; otherwise, the process 700 may return to block 704.

At block 716, the service configuration processor 160 or some other module or component of the consumer device 106 can obtain a snapshot of the current configuration state for the relevant service provider(s) 102 from the configuration management system 104, and replace the configuration state in the configuration state data store 164 as described in greater detail above.

Example Computing System Components

Figure 8:
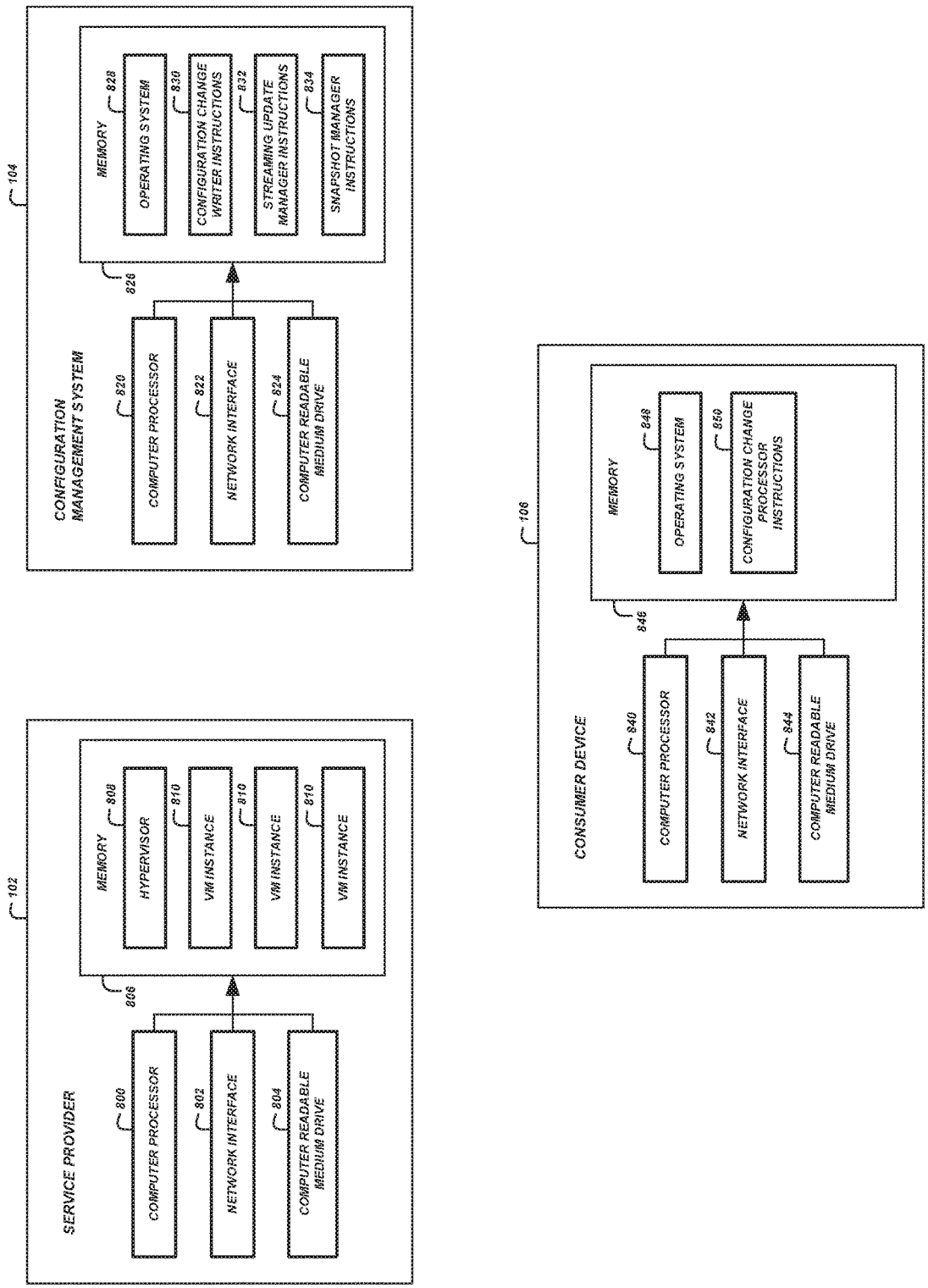
FIG. 8 is a block diagram of various components of a service provider device, configuration management device, and service consumer device according to some embodiments.

FIG. 8 shows components of an illustrative service provider 102, configuration management system 104, and consumer device 106.

In some embodiments, as shown, the service provider 102 may include: one or more computer processors 800, such as physical central processing units ("CPUs"); one or more network interfaces 802, such as a network interface cards ("NICs"); one or more computer readable medium drives 804, such as a high density disk ("HDDs"), solid state drives ("SDDs"), flash drives, and/or other persistent non-transitory computer-readable media; and one or more computer readable memories 806, such as random access memory ("RAM") and/or other volatile non-transitory computer-readable media. The computer readable memory 806 may include computer program instructions that the computer processor 800 executes in order to implement one or more embodiments. The computer readable memory 806 can store a hypervisor 808 that manages the instantiation, hosting, and termination of various VM instances 810.

In some embodiments, as shown, the configuration management system 104 may include: one or more computer processors 820, one or more network interfaces 822, one or more computer readable medium drives 824, and one or more computer readable memories 826. The computer readable memory 826 may include computer program instructions that the computer processor 820 executes in order to implement one or more embodiments. For example, the computer readable memory 826 can store an operating system 828 that provides computer program instructions for use by the computer processor 820 in the general administration and operation of the configuration management system 104. The computer readable memory 826 may also include configuration change writer instructions 830 for implementing the configuration change writer 502. The computer readable memory 826 may also include streaming update manager instructions 832 for implementing the streaming update manager 144. The computer readable memory 826 may also include snapshot manager instructions 834 for implementing the snapshot manager 146. In some embodiments, the configuration management system 104 may also include or be in communication with various data stores 140, 142 as described in greater detail above.

In some embodiments, as shown, the consumer device 106 may include: one or more computer processors 840, one or more network interfaces 842, one or more computer readable medium drives 844, and one or more computer readable memories 846. The computer readable memory 846 may include computer program instructions that the computer processor 840 executes in order to implement one or more embodiments. For example, the computer readable memory 846 can store an operating system 848 that provides computer program instructions for use by the computer processor 840 in the general administration and operation of the consumer device 106. The computer readable memory 846 may also include configuration change processor instructions 850 for implementing the configuration change processor 160. In some embodiments, the consumer device 106 may also include or be in communication with various data stores 162, 164 as described in greater detail above.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing service provider configuration changes, the system comprising:
   a plurality of configuration management cells, wherein each configuration management cell of the plurality of configuration management cells comprises one or more computing devices; and
   a cell manager comprising one or more computing devices, wherein the cell manager is configured to at least:
      assign a service provider to a first configuration management cell of the plurality of configuration management cells;
      perform a scaling operation on the plurality of configuration management cells based at least partly on a processing load of the plurality of configuration management cells, wherein the scaling operation comprises at least one of: adding a configuration management cell to the plurality of configuration management cells, or removing a configuration management cell from the plurality of configuration management cells;
      subsequent to performing the scaling operation, assign the service provider to a second configuration management cell of the plurality of configuration management cells;
      determine that a change to a configuration state of the service provider is to occur, wherein the change to the configuration state comprises a change from a first configuration of virtual machine instances to a second configuration of virtual machine instances used by the service provider to provide a computing service to a service consumer computing device;
      determine, based at least partly on an assignment of the second configuration management cell to the service provider, that the second configuration management cell is to process the change to the configuration state; and
      send a notification to the second configuration management cell regarding the change to the configuration state;
   wherein the second configuration management cell is configured to at least:
      determine a sequence number associated with the change to the configuration state based at least partly on a prior sequence number determined for a prior change to the configuration state;
      send, to the service consumer computing device, configuration change data representing the sequence number and the change to the configuration state;
      determine, based at least partly on a subsequent change to the configuration state, that the service consumer computing device is to obtain an updated representation of the configuration state of the service provider;
      send an invalidation signal to the service consumer computing device, wherein the invalidation indicates that the service consumer computing device is to obtain the updated representation of the configuration state; and
      send snapshot data to the service consumer computing device comprising the updated representation of the configuration state; and
   a configuration update proxy comprising one or more computing devices, wherein the configuration update proxy is configured to:
      receive, from the cell manager, a notification regarding the change to the configuration state;
      determine that the service provider is assigned to the second configuration management cell; and
      provide, to the second configuration management cell, the notification regarding the configuration change.

2. The system of claim 1, wherein the first configuration management cell is further configured to expose an application programming interface ("API") that provides a current sequence number associated with the configuration state to the service consumer computing device in response to an API request received from the service consumer computing device.

3. A system comprising:
   a pool of configuration management components, wherein at least a first configuration management component of the pool of configuration management components comprises one or more computing devices and is configured to:
      determine that a change to a configuration state of a service provider has occurred, wherein the change to the configuration state comprises a change from a first configuration of virtual machine instances to a second configuration of virtual machine instances used by the service provider to provide a computing service to a service consumer;
      determine a sequence number representing an order in which the service consumer is to update configuration state data to incorporate the change to the configuration state;
      generate configuration change data representing the sequence number and the change to the configuration state; and
      send, to the service consumer, the configuration change data;
   a pool management component comprising one or more computing devices, wherein the pool management component is configured to:
      assign the service provider to the first configuration management component;
      monitor an operating metric associated with the pool of configuration management components;
      perform a pool scaling operation based at least partly on the operating metric; and
      subsequent to performing the scaling operation, assign the service provider to a second configuration management component; and
   a configuration update proxy comprising one or more computing devices, wherein the configuration update proxy is configured to:
      receive, from the pool management component, a notification regarding the change to the configuration state;
      determine that the service provider is assigned to the first configuration management component; and provide, to the first configuration management component, the notification regarding the change to the configuration state.

4. The system of claim 3, wherein the scaling operation comprises one of: adding a new configuration management component to the pool of configuration management components, or removing an existing configuration management component from the pool of configuration management components.

5. The system of claim 3, wherein the pool management component is further configured to determine to perform the pool scaling operation based at least partly on the operating metric satisfying a criterion, wherein the criterion relates to one of: an amount of time taken by the first configuration management component to process a configuration state change; a number of configuration state changes processed by the first configuration management component; a number of service consumers associated with the first configuration management component; or a number of service providers associated with the configuration management component.

6. The system of claim 3, wherein the first configuration management component is further configured to:
  determine that an error has occurred in connection with generating sequential updates regarding the configuration state; and
  send a second notification to the service consumer, the second notification indicating that the service consumer is to obtain an updated version of configuration state data representing the configuration state.

7. The system of claim 3, wherein the first configuration management component is further configured to:
  determine, based at least partly on a subsequent change to the configuration state, that the service consumer is to replace the configuration state data with an updated copy of the configuration state data; and
  send a second notification to the service consumer, the second notification indicating that the service consumer is to obtain the updated version of the configuration state data.

8. The system of claim 7, wherein the first configuration management component being configured to determine, based at least partly on the subsequent change to the configuration state, that the service consumer is to replace the configuration state data with the updated version of the configuration state data comprises the first configuration management component being configured to determine that the subsequent change comprises moving a service resource from a first partition of service provider devices to a second partition of service provider devices.

9. The system of claim 3, wherein the first configuration management component is further configured to:
  generate a snapshot of the configuration state based at least partly on the change to the configuration state, wherein the snapshot comprises an updated version of the configuration state data; and
  send the snapshot to the service consumer.

10. The system of claim 3, wherein the first configuration management component is further configured to:
  store, in a first data set, sequential update data representing the change to the configuration state; and
  update a second data set based on the change to the configuration state, wherein the second data set comprises a representation of a complete version of the configuration state.

11. The system of claim 3, wherein the service provider being configured to provide the computing service comprises the service provider providing at least one of: data storage services; application execution services; or virtual machine hosting services.

12. The system of claim 3, wherein the first configuration of virtual machine instances comprises a set of virtual machine instances used by the service provider, and wherein the change to the configuration state comprises movement of a first virtual machine instance of the set of virtual machine instances from a first server computing device to a second server computing device.

13. The system of claim 12, wherein the configuration change data represents an assignment of the first virtual machine instance to a network address associated with the second server computing device.

14. The system of claim 3, wherein the first configuration of virtual machine instances comprises a set of virtual machine instances used by the service provider, and wherein the configuration change comprises one of: addition of a new virtual machine instance to the set of virtual machine instances, or termination of an existing virtual machine instance of the set of virtual machine instances.

* * * * *

UNITED STATES PATENT AND TRADEMARK OFFICE
CERTIFICATE OF CORRECTION

PATENT NO. : 10,990,385 B1
APPLICATION NO. : 16/218199
DATED : April 27, 2021
INVENTOR(S) : Alireza Farhangi Page 1 of 1

It is certified that error appears in the above-identified patent and that said Letters Patent is hereby corrected as shown below:

In the Drawings

In sheet 5 of 8, FIG. 5, Line 10 approx., delete "510C" and insert --510A--.

In the Specification

In Column 16, Line 32, delete "disk" and insert --disks--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*